(12) United States Patent
Lee

(10) Patent No.: US 8,225,670 B2
(45) Date of Patent: Jul. 24, 2012

(54) DEVICE AND METHOD OF TESTING A VIBRATING DEVICE

(75) Inventor: Chia-En Lee, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 412 days.

(21) Appl. No.: 12/550,886

(22) Filed: Aug. 31, 2009

(65) Prior Publication Data

US 2010/0175475 A1    Jul. 15, 2010

(30) Foreign Application Priority Data

Jan. 15, 2009    (CN) .................... 2009 1 0300189

(51) Int. Cl.
*G01H 11/00* (2006.01)

(52) U.S. Cl. .......................... 73/649; 73/655

(58) Field of Classification Search ............ 73/649, 73/652, 600, 602, 655, 658; 200/61.01
See application file for complete search history.

(56) References Cited

U.S. PATENT DOCUMENTS

| | | | | |
|---|---|---|---|---|
| 4,368,637 A | * | 1/1983 | Anderson | ............ 73/652 |
| 4,390,922 A | * | 6/1983 | Pelliccia | ............ 361/170 |
| 5,053,589 A | * | 10/1991 | Grant | ......... 200/61.45 R |
| 6,257,066 B1 | * | 7/2001 | Chandler et al. | ...... 73/660 |
| 6,457,366 B1 | * | 10/2002 | Hidaka et al. | ........ 73/634 |
| 6,485,571 B1 | * | 11/2002 | Graf | ............... 118/663 |
| 6,591,198 B1 | * | 7/2003 | Pratt | ................. 702/35 |
| 6,788,201 B2 | * | 9/2004 | Chen et al. | ........ 340/540 |
| 7,400,319 B2 | * | 7/2008 | Nakayama et al. | ...... 345/177 |
| 7,872,370 B2 | * | 1/2011 | Li et al. | ........... 307/10.1 |

FOREIGN PATENT DOCUMENTS

CN    2112237 U    8/1992

* cited by examiner

*Primary Examiner* — J M Saint Surin
(74) *Attorney, Agent, or Firm* — Altis Law Group, Inc.

(57) ABSTRACT

A device of testing a vibrating device includes a housing, a connector, an indicator, and a vibrating sensing apparatus. The connector, the indicator, and the vibrating sensing apparatus are mounted with the housing, and electronically connected in series. When the test device is vibrated by a portable electronic device received in the housing, the vibrating sensing apparatus forms a closed circuit with the connector and the indicator to activate the indicator to indicate whether the vibrating performance of the portable electronic device is normal or not.

10 Claims, 2 Drawing Sheets

DEVICE AND METHOD OF TESTING A VIBRATING DEVICE

BACKGROUND

1. Technical Field

The present disclosure generally relates to test devices, particularly to a device and method of testing a vibrating device.

2. Description of Related Art

Mobile devices typically provide the option to set it to ring in vibration mode. So testing vibrating performance of a portable electronic device becomes more necessary in manufacture.

A conventional device of testing a vibrating device such as a mobile device usually includes a vibrating sensor and a processing device connected to the sensor such as a computer. The vibrating sensor senses the vibration of the tested portable electronic device and converts the vibration of the tested portable electronic device to electronic signals. The processing device obtains the signals and judges whether the vibrating performance of the tested portable electronic device is normal. However the manufacture cost of a conventional test device like that is high.

Therefore, there is room for improvement within the art.

BRIEF DESCRIPTION OF THE DRAWINGS

Many aspects of a device and method of testing a vibrating device can be better understood with reference to the following drawings. The components in the drawings are not necessarily drawn to scale, the emphasis instead being placed upon clearly illustrating the principles of the device and method of testing a vibrating device.

DETAILED DESCRIPTION

Figure 1:
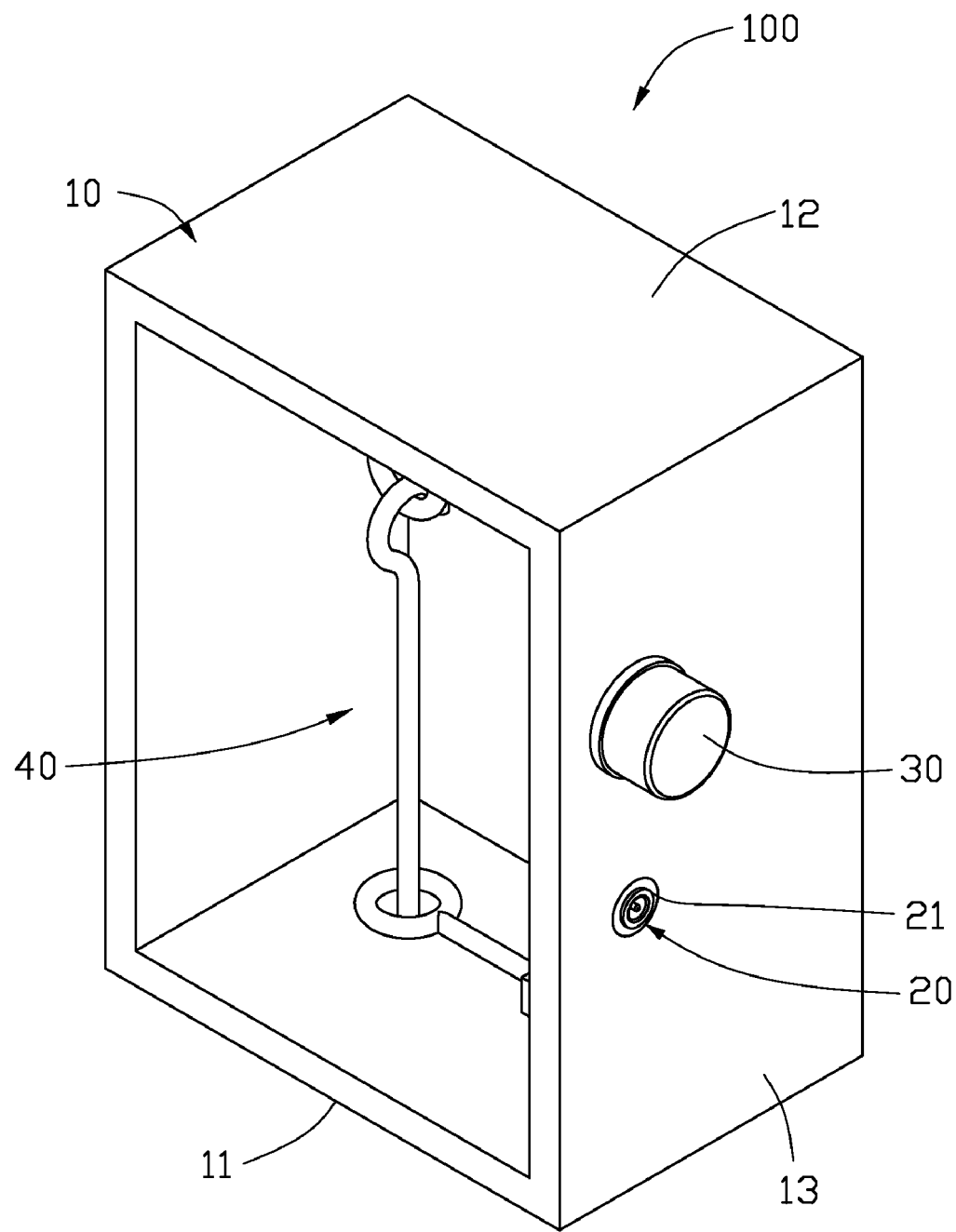
FIG. 1 shows a schematic view of a device of testing a vibrating device, according to an exemplary embodiment.
Figure 2:
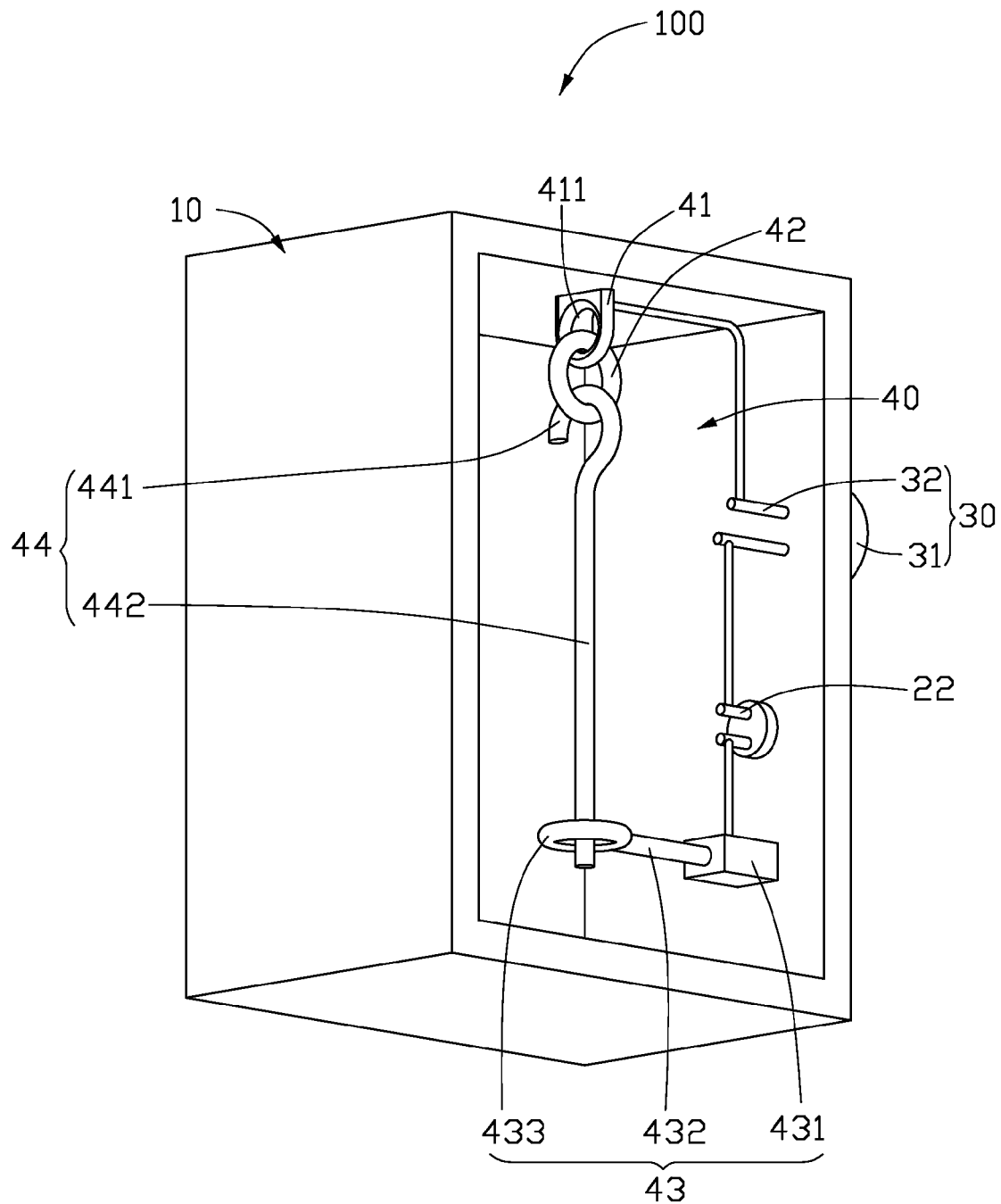
FIG. 2 is similar to FIG. 1, but shown in another angle.

Referring to FIGS. 1-2, a device of testing a vibrating device 100 includes a housing 10, a connector 20, an indicator 30, and a vibration sensing apparatus 40. The connector 20 and the indicator 30 are mounted with the housing 10. The vibrating sensing apparatus 40 is set inside the housing 10, and electronically connected to the connector 20 and the indicator 30 with a wire (not labeled).

The housing 10 is a frame including a bottom wall 11, a top wall 12, a bottom wall 11, and two side walls 13 connected to the bottom wall 11 and the top wall 12. The housing 10 is configured for mounting the connector 20, the indicator 30, and the vibrating sensing apparatus 40, and receiving the portable electronic device for testing.

The connector 20 is configured for connecting to a power supply for the device of testing a vibrating device 100. The connector 20 can be a plug or a universal serial bus (USB) connector. The connector 20 includes a connecting interface 21 and a first connecting portion 22. The connector 20 is mounted on one side wall 13 of the housing 10. The connecting interface 21 is exposed from the surface of the side wall 13 for connecting with an external power supply. The first connecting portion 22 is mounted inside the housing 10 and electronically connected to the vibrating sensing apparatus 40 and the indicator 30.

The indicator 30 is configured for indicating the vibrating performance of the tested portable electronic device. The indicator 30 includes an indicating portion 31 and a second connecting portion 32. The indicating portion 31 is mounted on one side wall 13 of the housing 10. The second connecting portion 32 is set inside of the housing 10, and electronically connected to the vibrating sensing apparatus 40 and the first connecting portion 22 of the connector 20. In this embodiment, the indicator 30 is a light emitting diode (LED).

The vibrating sensing apparatus 40 is made of electric conducting material including a positioning member 41, a connecting member 42, a contact 43, and a hanging pole 44. The positioning member 41 is secured on the inner surface of the top wall 12 of the housing 10. The connecting member 41 is electronically connected to the connecting portion 32 of the indicator 30 via a wire (not labeled). A mounting hole 411 is defined in the positioning member 41 for connecting the connecting member 42. The connecting member 42 is a ring engaged on the positioning member 41.

The contact 43 includes a positioning block 431, a connecting arm 432, and a circular contact 433. The positioning block 431 is secured on the inner surface of the side wall 13 of the housing 10 and electronically connected to the first connecting portion 22. The connecting arm 432 is a pole. One end of the connecting arm 432 is attached to the positioning block 431. Another end of the connecting arm 432 is connected to the circular contact 433. The circular contact 433 is connected to the circumferential surface of the connecting arm 432. The positioning block 431, the connecting arm 432, and circular contact 433 are substantially coplanar with each other, and parallel to the bottom wall 11.

The hanging pole 44 includes a connecting portion 441 and a hanging portion 442. The connecting portion 441 is a hook bent from one end of the hanging portion 442. The connecting portion 441 is hung on the connecting member 42. The hanging portion 442 is cylindrical having a radius smaller than that of the circular contact. When the hanging pole 44 is hung, the hanging portion 442 substantially hangs down through and is spaced from the circular contact 433. When the hanging pole 44 begins vibrating, the hanging portion 442 swings. If the degree of vibration reaches predetermined amplitude, the hanging portion 442 repeatedly engages and disengages with the circular contact 433.

In use, firstly putting a portable electronic device with vibrating function activated inside the housing 10 or on the top wall 12 of the housing 10, and then connecting the connector 20 to an external power supply. If the vibrating performance of the portable electronic device is normal, the hanging pole 44 will vibrate at the predetermined amplitude, and the hanging portion 442 of the hanging pole 44 will swing. When the hanging portion 442 contacts with the circular contact 443, the hanging pole 44 forms a closed circuit with the contact 43, the connecting member 42, the positioning member 41, the connector 20, and the indicator 30. Thus the indicator 30 will output visual light. When the hanging portion 442 separates from the circular contact 443, the circuit is opened. The indicator 30 will then be powered off. Thus, a result of the vibration test can be performed on the portable electronic device by observing the light visually. In addition, the radius of the circular contact 433 can be changed according to vibration intensity requirement of the tested portable electronic device.

In other embodiment, the connecting member 42 may be omitted, the hanging pole 44 hangs on the positioning member 41 directly, and electronically connects to the indicator 30 via a wire.

The device of testing a vibrating device 100 can test vibrating performance of the portable electronic device via the connector 20, indicator 30 and the vibrating sensing apparatus 40 with a simple structure and a low manufacture cost.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A device for testing a vibrating device, comprising:
a housing;
a connector;
an indicator; and
an electrical conductive vibrating sensing apparatus, comprising:
a positioning member secured on the housing,
a contact, the contact comprising a horizontally positioned circular contact and a connecting arm, one end of the connecting arm connected to the circumferential surface of the circular contact and another end of the connecting arm secured on the housing; and
a hanging pole, the hanging pole vertically hung down through the circular contact, when the hanging pole is vibrated by the vibrating device, the hanging pole swings, and repeatedly engages and disengages with the circular contact; wherein the connector, the indicator, and the vibrating sensing apparatus are mounted with the housing, and electronically connected in series, when the device is vibrated by the vibrating device, the vibrating sensing apparatus forms a closed circuit with the connector and the indicator to activate the indicator to indicate whether the vibrating performance of the vibrating device is normal or not.

2. The device for testing a vibrating device in claim 1, wherein the housing includes a bottom wall, a top wall, and two side walls connected to the bottom wall and top wall, the positioning member is disposed on the top wall inside of the housing, the contact is set on one of the side wall of the housing.

3. The device for testing a vibrating device in claim 1, wherein the positioning member is electronically connected to the indicator and the contact is electronically connected to the connector.

4. The device for testing a vibrating device in claim 1, wherein the positioning member defines a mounting hole therein for mounting the hanging pole.

5. The device for testing a vibrating device in claim 1, wherein the contact further comprises a positioning block secured on the housing, the connecting arm is attached to the positioning block.

6. The device for testing a vibrating device in claim 1, wherein the hanging pole includes a hanging portion and a connecting portion bent from one end of the hanging portion, the connecting portion hangs on the positioning member, the hanging portion substantially hangs down through and is spaced from the circular contact, and repeatedly engages and disengages with the circular contact when it swings.

7. The device for testing a vibrating device in claim 6, wherein the hanging portion is a pole.

8. The device for testing a vibrating device in claim 6, wherein the connecting portion is a hook.

9. The device for testing a vibrating device in claim 1, wherein the indicator is a LED.

10. The device for testing a vibrating device in claim 1, wherein when the hanging pole disengages with the circular contact, the closed circuit is broken; when the hanging pole engages with the circular contact, the closed circuit is formed.

* * * * *